United States Patent
Ikegami (10) Patent No.: US 8,515,760 B2
(45) Date of Patent: *Aug. 20, 2013

(54) MOBILE TERMINAL AND TEXT-TO-SPEECH METHOD OF SAME

(75) Inventor: Takashi Ikegami, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1057 days.

This patent is subject to a terminal disclaimer.

(21) Appl. No.: 11/335,142

(22) Filed: Jan. 19, 2006

(65) Prior Publication Data

US 2006/0161426 A1  Jul. 20, 2006

(30) Foreign Application Priority Data

Jan. 19, 2005  (JP) ................................ 2005-012026

(51) Int. Cl.
  *G10L 13/08* (2006.01)
(52) U.S. Cl.
  USPC ........................................................ 704/260
(58) Field of Classification Search
  USPC ........................................................ 704/260
  See application file for complete search history.

(56) References Cited

U.S. PATENT DOCUMENTS

| | | | | |
|---|---|---|---|---|
| 4,125,868 A | * | 11/1978 | Hruby et al. ................... | 715/272 |
| 5,842,167 A | * | 11/1998 | Miyatake et al. .............. | 704/260 |
| 5,959,630 A | * | 9/1999 | Takeuchi et al. .............. | 715/835 |
| 5,983,184 A | * | 11/1999 | Noguchi ....................... | 704/270 |
| 6,052,663 A | * | 4/2000 | Kurzweil et al. .............. | 704/260 |
| 6,088,675 A | * | 7/2000 | MacKenty et al. ............. | 704/270 |
| 6,115,686 A | * | 9/2000 | Chung et al. ................... | 704/260 |
| 6,205,427 B1 | * | 3/2001 | Itoh et al. ..................... | 704/260 |
| 6,282,511 B1 | * | 8/2001 | Mayer .......................... | 704/270 |
| 6,334,106 B1 | * | 12/2001 | Mizuno et al. ................. | 704/260 |
| 6,718,015 B1 | * | 4/2004 | Berstis ......................... | 379/88.17 |
| 6,819,336 B1 | * | 11/2004 | Nielsen ........................ | 715/711 |
| 6,823,311 B2 | * | 11/2004 | Tetsumoto .................... | 704/270.1 |
| 6,993,707 B2 | * | 1/2006 | Baker et al. ................... | 715/241 |

(Continued)

FOREIGN PATENT DOCUMENTS

| JP | 05281992 A | 10/1993 |
|---|---|---|
| JP | 11-252216 | 9/1999 |

(Continued)

OTHER PUBLICATIONS

Chinese language office action dated Oct. 9, 2010 and its English language translation for corresponding Chinese application 200610073959.3.

*Primary Examiner* — Richemond Dorvil
*Assistant Examiner* — Olujimi Adesanya
(74) *Attorney, Agent, or Firm* — DLA Piper LLP (US)

(57) ABSTRACT

A mobile terminal able to achieve smooth text-to-speech conversion, that is, a mobile terminal able to display on a display unit information acquired from a server connected to a network by a communication unit, comprising a storage unit; a speech synthesizer for converting text to speech; and a controller for extracting from the acquired information display objects and display rules defined by the server providing the display objects, storing the display objects and the display rules in the storage unit linked with each other, and displaying the same on the display unit according to the display rules, wherein when start-up of the speech synthesizer is requested in the state displaying the acquired information, the controller controls so that the speech synthesizer converts the text extracted from the display objects to speech with reference to the display rules stored in the storage unit; and a text-to-speech method of the same.

16 Claims, 8 Drawing Sheets

(56) References Cited

U.S. PATENT DOCUMENTS

| | | | |
|---|---|---|---|
| 7,353,175 B2* | 4/2008 | Kaneko | 704/260 |
| 7,729,917 B2* | 6/2010 | Miyamoto et al. | 704/270 |
| 2002/0184004 A1* | 12/2002 | Shizuka et al. | 704/200 |
| 2002/0198720 A1* | 12/2002 | Takagi et al. | 704/270.1 |
| 2005/0033577 A1* | 2/2005 | Bradley et al. | 704/270.1 |
| 2005/0071165 A1* | 3/2005 | Hofstader et al. | 704/270.1 |
| 2006/0136216 A1* | 6/2006 | Shen et al. | 704/266 |
| 2006/0190260 A1* | 8/2006 | Iso-Sipila | 704/258 |
| 2006/0209212 A1* | 9/2006 | Murase et al. | 348/558 |
| 2006/0224386 A1* | 10/2006 | Ikegami | 704/260 |

FOREIGN PATENT DOCUMENTS

| | | |
|---|---|---|
| JP | 2000099624 A | 4/2000 |
| JP | 2004-185055 | 7/2004 |
| WO | WO 2004055779 A1 * | 7/2004 |

* cited by examiner

※ "APPLES", "TWO", AND "MELONS" SHOW LINKS
※ "APPLES" SELECTED BY CURSOR

FIG. 5

| TRANSFERRED INFORMATION OF "APPLES" | COORDINATE VALUES (X:0, Y:5), |
| --- | --- |
| | STYLE: LINK |
| | NUMBER OF LETTERS: 6 |
| SETTING OF CURRENT FONT SIZE | FONT SIZE STANDARD |
| CORRECTION VALUE OF STYLE (LINK) | FONT SIZE SMALL: Y-3, FONT SIZE STANDARD: Y-5, FONT SIZE LARGE: Y-8 |

FIG. 6

STORAGE MANAGEMENT INFORMATION

| x | y | STYLE | LENGTH | *read_ptr |
|---|---|---|---|---|
| 0 | 0 | 0x00 | 6 | |
| 100 | 20 | 0x00 | 5 | |
| 200 | 20 | 0x00 | 3 | |
| 30 | 40 | 0x00 | 5 | |
| 130 | 40 | 0x00 | 6 | |
| 60 | 60 | 0x00 | 6 | |
| 160 | 60 | 0x00 | 5 | |
| 0 | 80 | 0x00 | 6 | |
| 100 | 80 | 0x00 | 5 | |
| 0 | 20 | 0x01 | 6 | |
| : | : | : | | |
| : | : | : | | |
| | | 0xFF | | |

STORAGE REGION OF TEXT

| |
|---|
| FRUIT: |
| 100 YEN |
| TWO |
| ORANGES |
| 200 YEN |
| MELONS |
| 300 YEN |
| STRAWBERRIES |
| 400 YEN |
| APPLES |

BEFORE TEXT SORTING

FIG. 7

| STYLE | LENGTH | *read_ptr | |
|---|---|---|---|
| 0x00 | 6 | | → FRUIT: |
| 0x01 | 6 | | → APPLES |
| 0x00 | 5 | | → 100 YEN |
| 0x00 | 3 | | → TWO |
| 0x00 | 6 | | → ORANGES |
| 0x00 | 5 | | → 200 YEN |
| 0x00 | 6 | | → MELONS |
| 0x00 | 5 | | → 300 YEN |
| 0x00 | 6 | | → STRAWBERRIES |
| 0x00 | 5 | | → 400 YEN |

AFTER TEXT SORTING

FIG. 8

MOBILE TERMINAL AND TEXT-TO-SPEECH METHOD OF SAME

BACKGROUND OF THE INVENTION

1. Field of the Invention

The present invention relates to a mobile terminal having a function of converting items on a display from text into speech and to a text-to-speech method of the same.

2. Description of the Related Art

In recent years, as mobile terminals, mobile phones speaking aloud the names of function etc. set by key operations have been proposed (see for example Japanese Unexamined Patent Publication (Kokai) No. 11-252216). Such a mobile phone has a plurality of key operation units, a controller for setting a function corresponding to one or more key operations of the key operation units among a plurality of functions provided in the phone, and a speech synthesizer for outputting by speech the name of the function set linked with the key operations.

Further, as a system employing the speech output function, an e-mail system enabling a sender to select the speech quality to be used for converting text to speech at the receiving side when sending text by e-mail has been proposed (see for example Japanese Unexamined Patent Publication (Kokai) No. 2004-185055).

In a mobile terminal having the above text-to-speech conversion function, the function is realized by transferring the text to the engine (controller and speech synthesizer) for conversion to speech.

However, the web or other installed browsers will notify drawing information displaying text to the mobile terminal side, but will not notify the actual text for conversion to speech. The drawing information is notified with the text divided into small sections, so if notifying these to the engine as they are, a sentence will be frequently interrupted. Further, a sequence of notification of the text will not always be from the top of the display, therefore if converting the text to speech in the sequence of notification, a suitable sentence will not be obtained. Further, according to a style of the drawing, even text on the same row may be notified with deviated coordinate values, therefore will not be able to be treated as text on the same row.

Further, it is known to modify the browser side and add a text-to-speech interface to realize text-to-speech conversion, but even in this case, general sites (HTML etc.) cannot be displayed. Only specific sites can actually be handled. Further, since the browser is modified, the drawing greatly differs from that of the ordinary browser (state where all of the displayed text is linked to). Browser viewing is therefore restricted in many ways.

SUMMARY OF THE INVENTION

An object of the present invention is to provide a mobile terminal enabling smooth text-to-speech conversion and a text-to-speech method of same.

According to a first aspect of the present invention, there is provided a mobile terminal, comprising: a communication unit for communicating with a server connected to a network; a display unit for displaying information acquired from the server; a storage unit for storing information; a speech synthesizer for converting text to speech; and a controller for extracting from the acquired information display objects and display rules defined by the server providing the display objects, storing the display objects and the display rules in the storage unit linked with each other, and displaying the display objects on the display unit according to the display rules, wherein when start-up of the speech synthesizer is requested in the state displaying the acquired information, the controller controls so that the speech synthesizer converts the text extracted from the display objects to speech with reference to the display rules stored in the storage unit.

Preferably, the display rules include at least display coordinates of the display objects, and the controller controls so that the speech synthesizer converts text to speech after sorting the display objects stored in the storage unit by the display coordinates when start-up of the speech synthesizer is requested in the state displaying acquired information.

Alternatively, the display rules include at least display coordinates and display formats of the display objects, the storage unit stores correction values for the display coordinates for the plurality of display formats, and the controller sorts the display objects after correcting them by correction values in accordance with the display formats of the individual display objects.

Alternatively, the display rules includes at least the display coordinates and display sizes of the display objects, the storage unit stores correction values for the display coordinates for the plurality of display sizes, and the controller sorts the display objects after correcting them by correction values in accordance with the display sizes of the individual display objects.

Alternatively, the display rules include at least display formats of the display objects, and the controller searches for a display object linked with the display format for display where the cursor is located from among the plurality of display objects stored in the storage unit and controls the speech synthesizer so as to convert the text of the retrieved display object to speech when start-up of the speech synthesizer is requested in the state displaying the acquired information.

According to a second aspect of the present invention, there is provided a text-to-speech method of a mobile terminal having a speech synthesizing function and a display function and displaying information acquired from a server connected to a network, comprising a first step of extracting from the acquired information display objects and display rules defined by a server providing the display objects and a second step of storing the display objects and the display rules linked with each other in a storage unit and displaying the display objects according to the display rules, wherein the second step comprises a step of converting the text extracted from the display objects to speech with reference to the display rules stored in the storage unit when start-up of the speech synthesizing function is requested in the state displaying the acquired information.

BRIEF DESCRIPTION OF THE DRAWINGS

These and other objects and features of the present invention will become clearer from the following description of the preferred embodiments given with reference to the attached drawings, wherein:

FIGS. 2A to 2D are views illustrating an example of the outer appearance of a mobile phone, in which

DESCRIPTION OF THE PREFERRED EMBODIMENTS

Below, an embodiment of the present invention will be explained with reference to the attached drawings.

Figure 1:
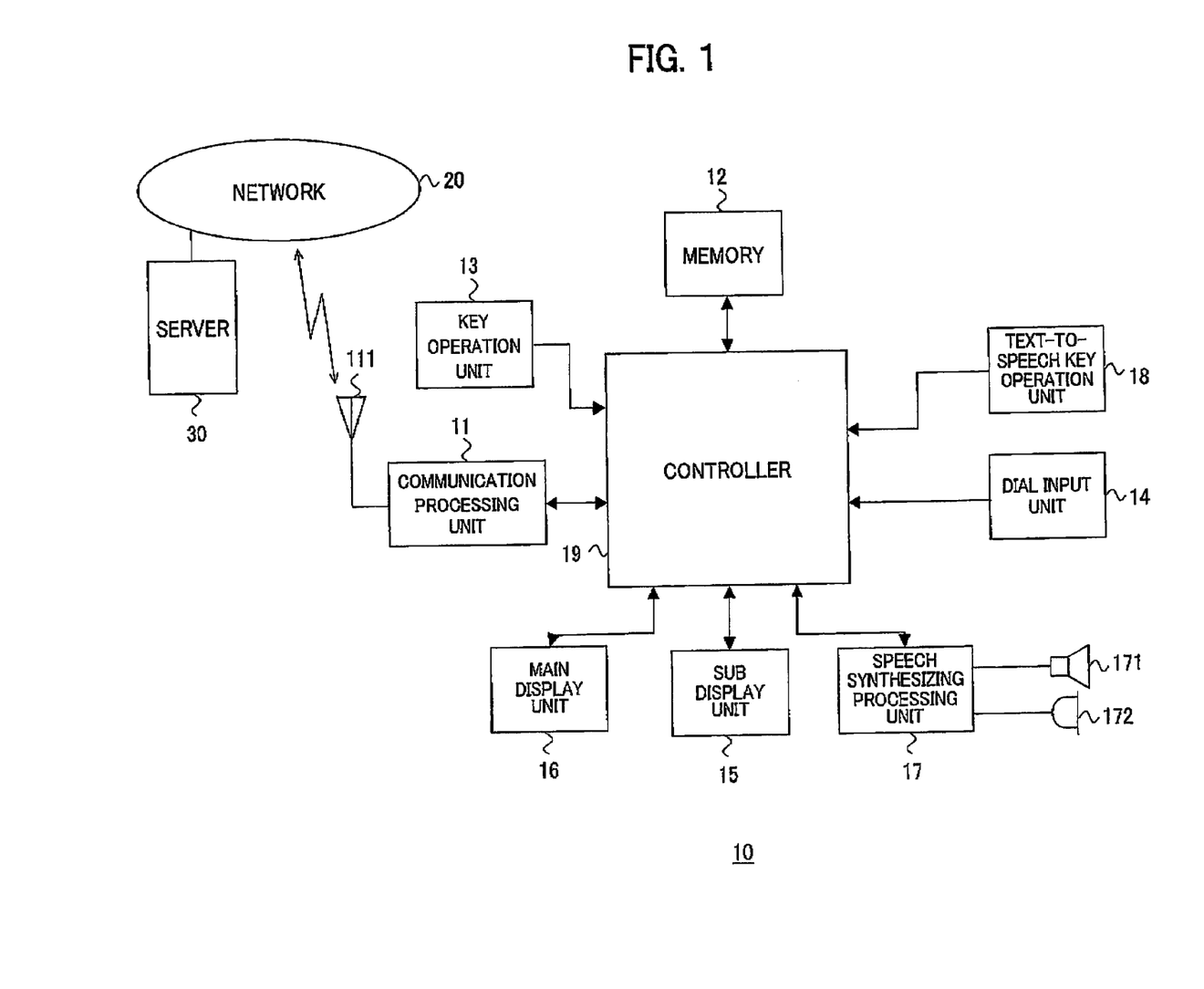
FIG. 1 is a block diagram illustrating an example of the system configuration of a mobile phone.
Figures 2A, 2C:
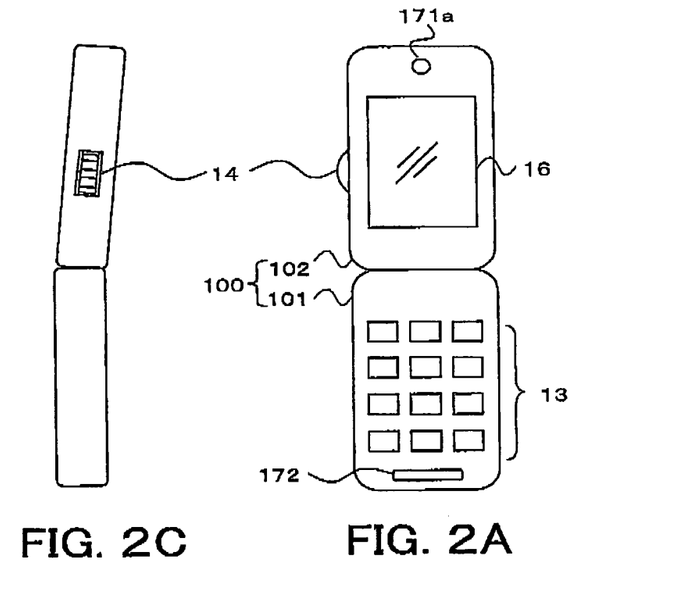
FIG. 2A is a view of the outer appearance of a front surface.
FIG. 2C is a view of the outer appearance of the front surface.
Figure 2B:
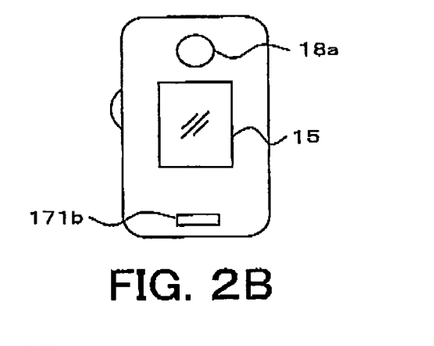
FIG. 2B is a view of the outer appearance of a back surface.
Figure 2D:
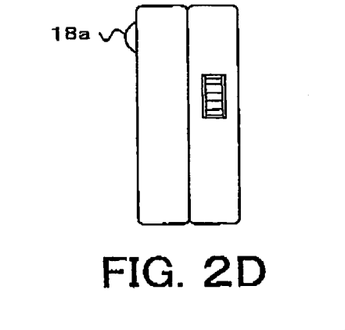
FIG. 2D is a view of the outer appearance of the back surface.

FIG. 1 is a diagram showing an example of the system configuration of a mobile phone 10 as a mobile terminal of the present invention. FIGS. 2A to 2D are views of an example of the outer appearance of the mobile phone 10. The mobile phone 10 is a so-called flip-open type mobile phone having a movement mechanism. FIG. 2A is a front view in an opened state, FIG. 2B is a front view in a closed state, FIG. 2C is a side view in the opened state, and FIG. 2D is a side view in the closed state.

The mobile phone 10 according to the present embodiment is configured so that web information acquired from a server 30 connected to a wireless communication network 20 (acquired information) can be displayed on a display unit. Further, the mobile phone 10 according to the present embodiment has a text-to-speech conversion function in addition to ordinary functions of a phone and is configured so as to treat for example text notified as a drawing request from the browser as text information for text-to-speech and so as to be able to give a display equivalent to that of an ordinary browser without modifying the browser.

Further, the mobile phone 10 according to the present embodiment is provided with the following processing functions. The mobile phone 10 extracts display objects to be displayed and style and other display rules defined by content managed on a server 30 providing the display objects based on the acquired web information, stores the display objects and the display rules in the storage unit linked with each other, and displays the display objects according to the extracted style or other display rules. Note that the display rules include display coordinates (X, Y), display formats (styles), and display sizes. Further, the mobile phone 10 has a function of converting text extracted from the display objects to speech by a speech synthesizer with reference to the styles (display rules) stored in the storage unit when start-up of the text-to-speech conversion function (speech synthesizer) is requested for a text-to-speech operation in the state of display of acquired Web information.

Alternatively, the mobile phone 10 has a function of converting the text to speech after sorting the display objects stored in the storage unit for display coordinates when start-up of the text-to-speech conversion function (speech synthesizer) is requested in the state displaying the acquired web information. Alternatively, the mobile phone 10 has a function of storing correction values for display coordinates for a plurality of display formats and sorting the display objects after correcting them by the correction values in accordance with the display formats of the individual display objects. Alternatively, the mobile phone 10 has a function of storing correction values for display coordinates for a plurality of display sizes and sorting the display objects after correcting them by the correction values in accordance with the display sizes of the individual display objects. Alternatively, the mobile phone 10 has a function of searching for a display object linked with the display format for display where the cursor is located from among the plurality of display objects stored in the storage unit and converts the text of the retrieved display object to at least speech when start-up of the text-to-speech conversion function (speech synthesizer) is requested in the state displaying the acquired web information.

Below, the configurations and functions of the parts and the text-to-speech conversion control of the mobile phone 10 according to the present embodiment will be explained in sequence.

As shown in FIG. 1, the mobile phone 10 has a communication processing unit 11 including a transmission/reception antenna 111, a memory (storage unit) 12, a key operation unit 13, a dial input unit 14, a sub display unit 15, a main display unit 16, a speech synthesizing processing unit 17 including a speaker 171 and a microphone 172, a text-to-speech key operation unit 18, and a controller (CPU) 19. Further, as shown in FIG. 2A, a main case 100 of the mobile phone 10 is configured by a key input side main case 101 as a first housing and a display side main case 102 as a second housing connected by a not shown movement mechanism to form the opened/closed state.

The communication processing unit 11 performs wireless communication operations via a base station, for example, calling up a phone number and sending or receiving e-mail. The communication processing unit 11 includes the transmission/reception antenna 111. It modulates audio information, e-mail, etc. processed at the controller 19 and transmits the same via a not shown base station and the communication network 20 to the server 30 by the transmission/reception antenna 111 for wireless communication using radio waves. Further, the communication processing unit 11 demodulates e-mail, audio information, and other various information transmitted wirelessly from the base station and received at the transmission/reception antenna 111 and outputs the same to the controller 19. The communication processing unit 11 outputs web information (acquired information) acquired from the server 30 connected to the wireless communication network 20 to the controller 19. Note that, in the present embodiment, the transmission/reception antenna 111 is built in the key input side main case 101 or the display side main case 102 and not exposed to the outside in FIG. 2.

The memory (storage unit) 12 is configured by an EEPROM or other nonvolatile memory and stores a control program for transmitting and receiving speech and mail, an Internet browser, message data, an address book registering names and phone numbers, etc. The memory 12 stores a text-to-speech conversion database including the text necessary for the text-to-speech function mentioned later. In this database, the text for conversion to speech is systematically arranged in context so as to form sentences. The memory 12 stores a control table and weighting table of the text-to-speech conversion function. The memory 12 stores "standard text", "shortened text", and "explanatory text" corresponding to the menu displayed by the display unit. The memory 12 stores the display objects extracted from the web information in the controller 19 and the display rules defined by the server providing the display objects linked together. Further, the memory 12 stores correction values for display coordinates for the plurality of display formats from the controller 19.

Further, the memory 12 stores correction values for display coordinates for the plurality of display sizes from the controller 19.

The key operation unit 13 includes an end (hang up)/power key, a start (call) key, tenkeys corresponding to numerals, etc. By the operation by the user of these keys, the input information by the user is output to the controller 19. Further, by the operation of the key operation unit 13, it is possible to set whether or not to speak aloud the items of the control table of the text-to-speech function stored in the memory 12 (ON/OFF) through the controller 19.

The dial input unit 14 is a dial type of input unit. It is arranged on the side face of the display side main case 102 so as to facilitate operation by the thumb of the user when the user holds the mobile phone 10 in the opened state as shown in FIG. 2C and is configured so that upward and downward, that is, two-way, operation is possible. By operating the dial input unit 14, the user can change the output volume of the audio and the font size displayed on the sub display unit 15 and the main display unit 16. Further, as apparent from FIG. 2C and FIG. 2D, when comparing the dial input unit 14 between the closed state and the opened state, the two-way upward and downward operation directions are physically reversed, but in the present embodiment, the controller 19 controls things so that the user is not made to feel odd by making the operation direction as seen from the user and the action with respect to the operation (for example, the above change of volume and display font size (displayed font size)) always coincide.

The sub display unit 15 has a liquid crystal display (LCD) or other display viewed by the user in the closed state as shown in FIG. 2B. The main display unit 16 has an LCD or other display viewed by the user in the opened state as shown in FIG. 2A. The sub display unit 15 and the main display unit 16 display text of a received e-mail and a variety of text data etc. stored in the memory 12 in the closed state and the opened state under the control of the controller 19. Further, the sub display unit 15 and the main display unit 16 display the acquired web information in the format according to the display rules (display coordinates, display format, or/and display size) stored in the memory 12 under the control of the controller 19 in the closed state and the opened state.

The speech synthesizing processing unit 17 has an audio processing circuit to which a speaker 171 for outputting audio and a microphone 172 for inputting audio are connected for the call function. The speech synthesizing processing unit 17 performs predetermined processing with respect to the audio picked up the microphone 172 and supplies the same to the controller 19. Further, the speech synthesizing processing unit 17 performs predetermined processing with respect to the audio information supplied by the controller 19 and makes the speaker 171 output it.

Further, as shown in FIGS. 2A and 2B, the speaker 171 includes a speech speaker 171a and a ringer speaker 171b, that is, two audio output units, and outputs audio of the result of the processing of the text-to-speech function. Further, the speech synthesizing processing unit 17 has a speech synthesizing circuit which, at the time of text-to-speech conversion, converts text data or explanations read out and extracted from the memory 12 to audio data in the controller 19 and synthesizes speech by the audio output unit constituted by the speech speaker 171a or the ringer speaker 171b.

The text-to-speech key operation unit 18 is configured by a pushbutton 18a arranged at the center of the display side main case 102 and an input circuit for the switch input by the pushbutton as shown in FIG. 2B. The mobile phone 10 in the present embodiment has a text-to-speech function and is controlled by the controller 19 so that when the pushbutton 18a is depressed (operated), it outputs speech from the ringer speaker 171a in the closed state and outputs speech from the speech speaker 171 in the opened state.

The controller 19 is mainly configured by a microcomputer which controls the mobile phone 1 as a whole. For example, the controller 19 controls the wireless transmission/reception of various information in the communication processing unit 11, the processing of audio information for the speech synthesizing processing unit 17, the display of information to the main display unit 16, the processing in response to the input information of the key operation unit 13, access with respect to the memory 12, etc.

The controller 19 basically executes the text-to-speech function of the displayed text when the user operates the pushbutton 18a. At that time, the text-to-speech function used is not of a type outputting audio data for text-to-speech conversion, but of a type extracting/generating text and converting to speech the text.

The controller 19 starts up the browser, extracts from the acquired web information the display objects and the display rules defined for each content on the server 30 providing the display objects, and stores the display objects and the display rules in the memory 12 linked with each other. The controller 19 makes the main display unit 16 or the sub display unit 15 display the display objects according to the extracted display rules. When the acquired web information is being displayed on the main display unit 16 or the sub display unit 15 and, in that display state, for example the text-to-speech key operation unit 18 is operated to request start-up of the speech synthesizing processing unit 17, the controller 19 makes the speech synthesizing processing unit 17 convert the text extracted from the display objects to speech with reference to the display rules stored in the memory 12.

Further, when the acquired web information is being displayed on the main display unit 16 or the sub display unit 15 and, in that display state, for example the text-to-speech key operation unit 18 is operated to request start-up of the speech synthesizing processing unit 17, the controller 19 sorts the display objects stored in the memory 12 by the display coordinates and then makes the speech synthesizing processing unit 17 converts the text to speech.

Further, the controller 19 stores correction values for display coordinates in the memory 12 for the plurality of display formats. The controller 19 sorts the display objects after correcting the same by the correction values stored in the memory 12 in accordance with the display formats of the individual display objects.

Further, the controller 19 stores correction values for the display coordinates in the memory 12 for the plurality of display sizes. The controller 19 sorts the display objects after correcting the same by the correction values stored in the memory 12 in accordance with the display sizes of the individual display objects.

Further, when the acquired web information is being displayed on the main display unit 16 or the sub display unit 15 and, in that display state, for example the text-to-speech key operation unit 18 is operated to request start-up of the speech synthesizing processing unit 17, the controller 19 searches for a display object linked with the display format for display where the cursor is located from among a plurality of display objects stored in the memory 12 and makes the speech synthesizing processing unit 17 convert the text of the retrieved display object to speech.

Further, the controller 19 has the function of control for correcting the coordinate values in accordance with the style of the transferred text and for text-to-speech operation not by the sequence of transfer, but after sorting by the coordinates plus a function of controlling the speech synthesizing processing unit 17 so as to change the speech quality, speed, intonation, etc. of the text-to-speech operation in accordance with the drawing style or change the speech quality, speed, and intonation of the text-to-speech operation at the time of change of the selectable object.

Further, the controller 19 controls the system so as to interrupt the text-to-speech operation when another screen is displayed. Further, the controller 19 controls the system so as to convert text to speech only the first time even when a plurality of drawing requests are transferred for the same text even when blinking is designated. The controller 19 controls the speech synthesizing processing unit 17 so as to convert text transferred divided into several sections into speech all together when converting text to speech by the same speech quality.

Further, the controller 19 prevents interruption of a text-to-speech operation by buffering the newly displayed text during the text-to-speech operation. Further, the controller 19 controls the speech synthesizing processing unit 17 so as to interrupt the text-to-speech operation when another screen is displayed. Further, the controller 19 controls the speech synthesizing processing unit 17 so as to interrupt the text-to-speech operation when the cursor moves to a selectable object and converts the corresponding object to speech. Further, the controller 19 prevents overlapping text-to-speech operations by determining a text-to-speech target range by coordinate values for text partially projecting from display areas of the display units 16 and 15. Further, the controller 19 is configured so as to notify text again by a display request when text is not notified, for example, at the time of a cache display.

Next, the operation by the above configuration will be explained with reference to FIG. 3 to FIG. 8 focusing on the display of information and text-to-speech conversion operation at the time of start-up of the browser.

Figure 3:
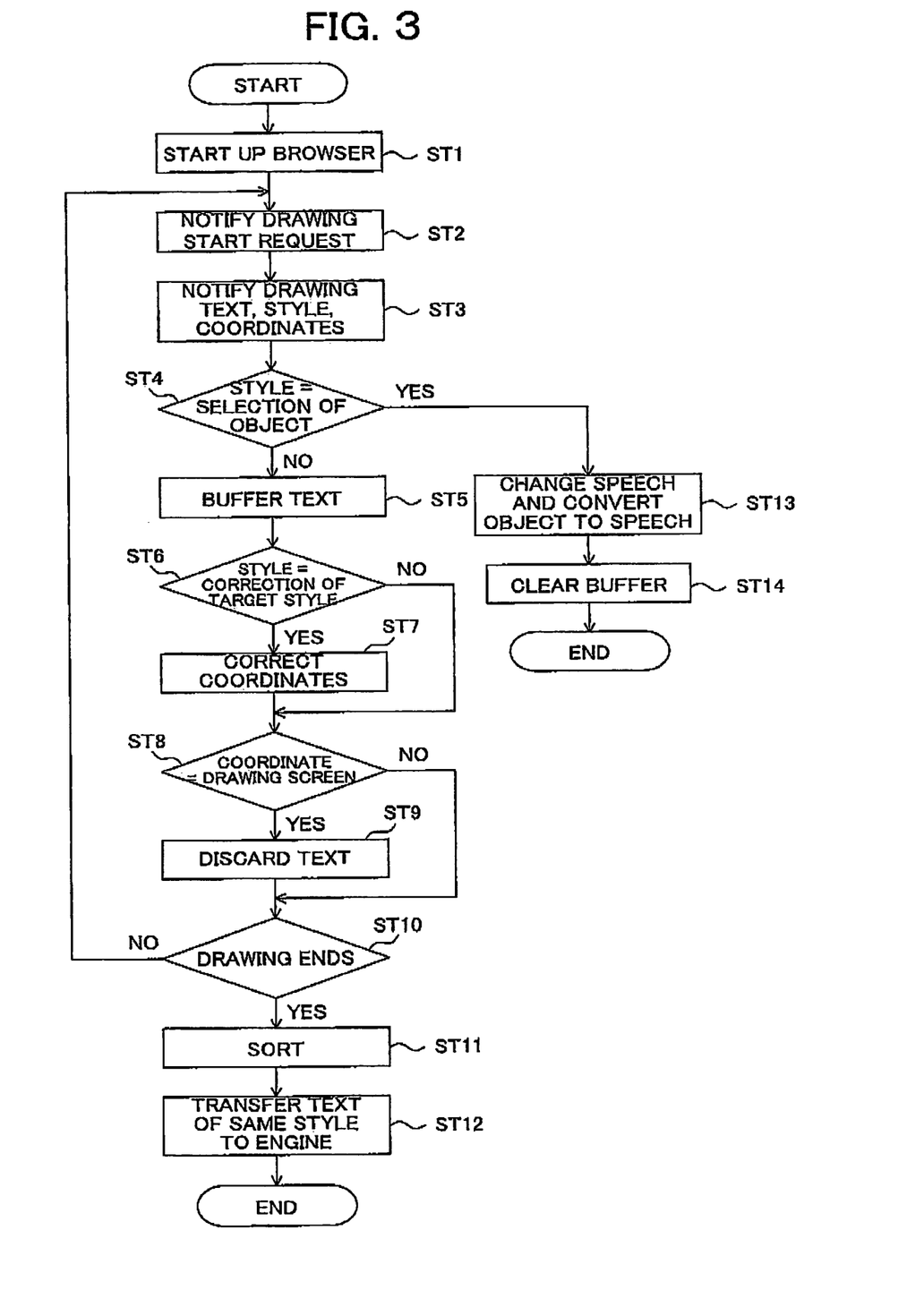
FIG. 3 is a flow chart for explaining the display of information and text-to-speech conversion operation at the time of start-up of a browser according to the present embodiment.
Figure 4:
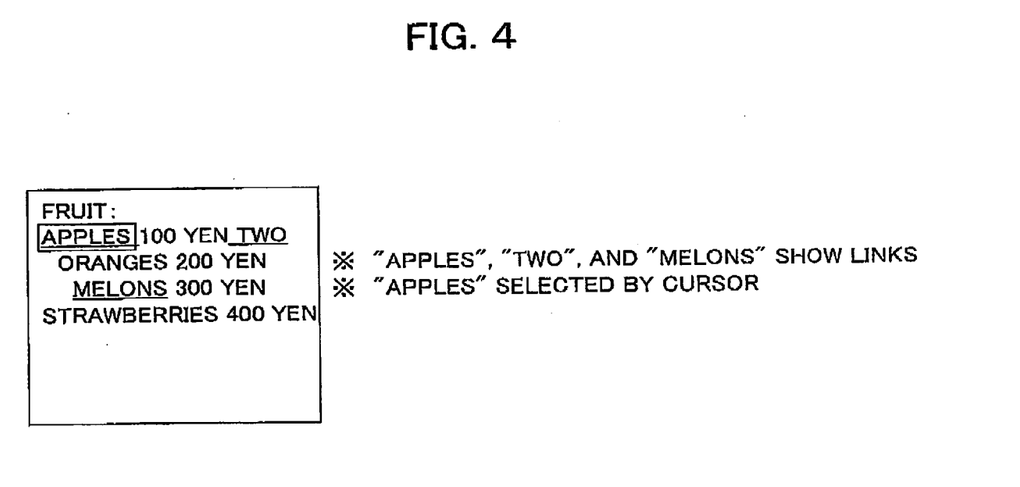
FIG. 4 is a view of an image of a display image of a specific style according to the present embodiment.
Figure 5:
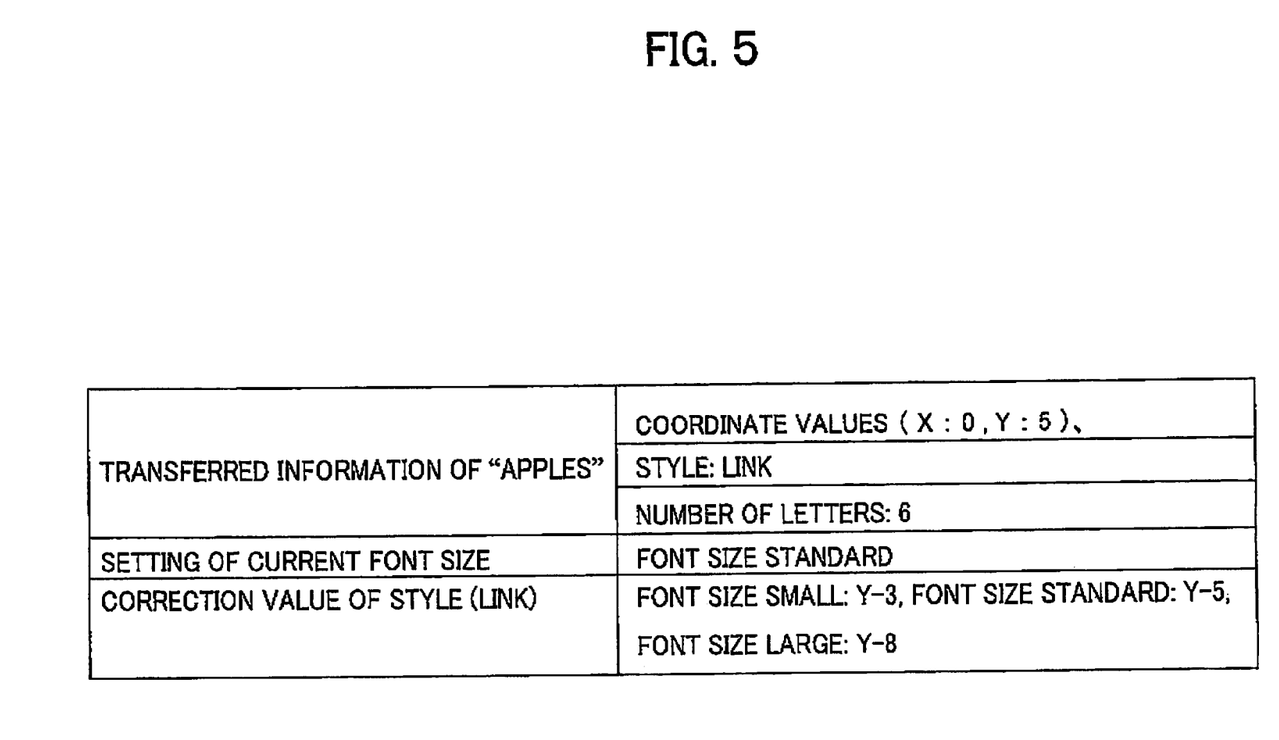
FIG. 5 is a view of an example of correction values of the notified information, the current font size, and the style (links) according to the present embodiment.
Figure 6:
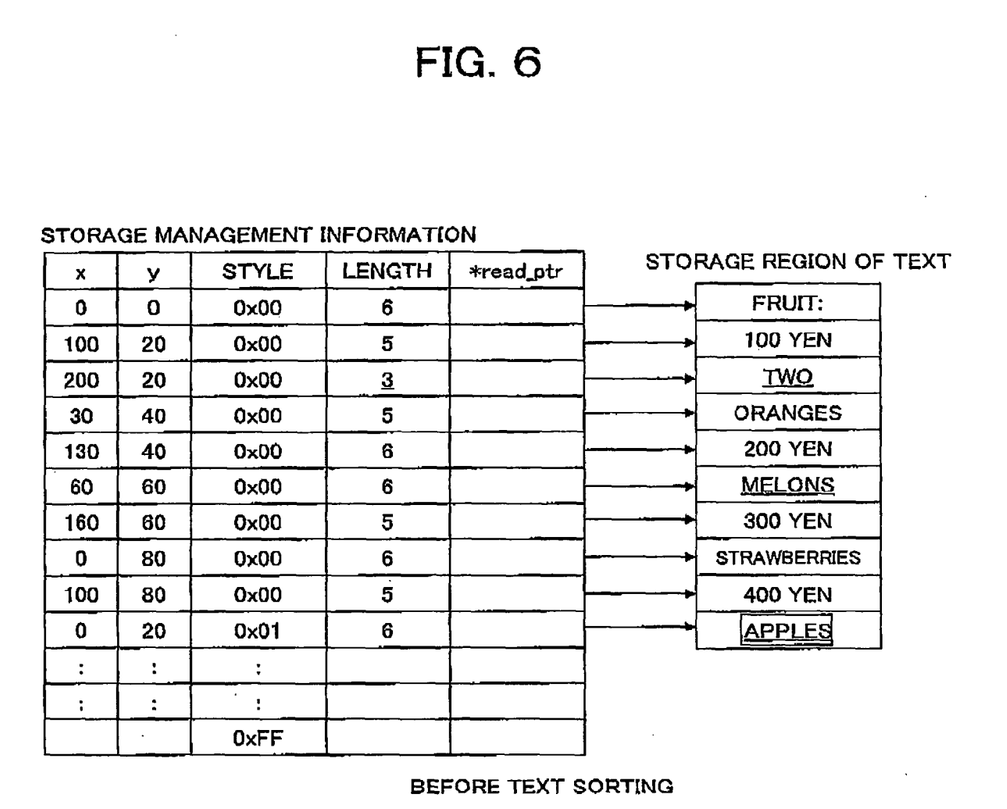
FIG. 6 is a view of an example of storage in a storage region of storage management information and text before sorting of text according to the present embodiment.
Figure 7:
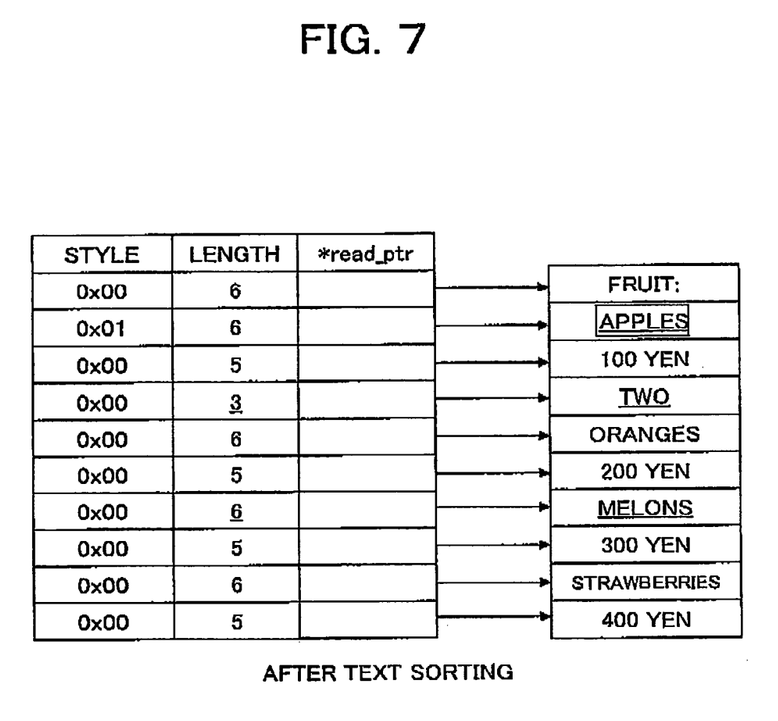
FIG. 7 is a view of an example of storage in a storage region of the storage management information and text after sorting of text according to the present embodiment.
Figure 8:
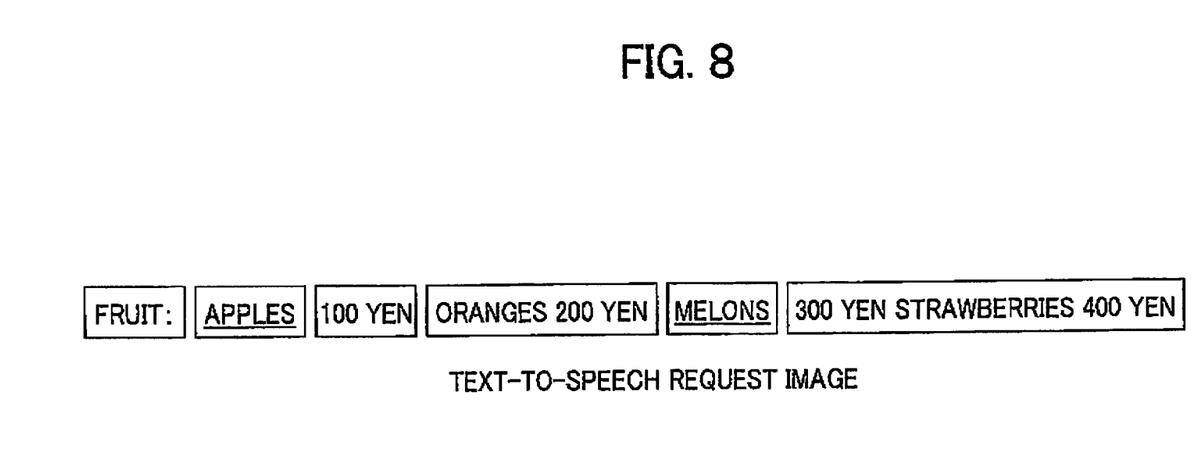
FIG. 8 is a view of an example of the image of a text-to-speech request according to the present embodiment.

FIG. 3 is a flow chart for explaining the display of information and text-to-speech conversion operation at the time of start-up of the browser. FIG. 4 is a diagram showing an image of the display image by a specific style. FIG. 5 is a table showing an example of the nitified information, the current font size, and the correction values of the style (link). FIG. 6 is a table showing an example of the storage of storage management information and storage regions of text before sorting of the text, FIG. 7 is a table showing an example of the storage of storage management information and storage regions of text ater sorting of the text. FIG. 8 is a diagram showing an example of the image of a text-to-speech request.

When the browser is started up (ST1) and a notification of start request of a drawing is issued (ST2), the text to be drawn, the style, and the coordinates are notified (ST3). Next, it is judged whether or not the style information among the acquired information is selection of an object (ST4). When it is judged at step ST4 that it is selection, the acquired text is for example stored (buffered) in the memory 12 (ST5). Next, it is judged whether or not the acquired style is a style for correction (ST6). When it is judged at step ST6 that the acquired style is a style for correction, the coordinate values are corrected (ST7) and the routine proceeds to the processing of step ST8, while when it is judged that the acquired style is not style for correction, the routine proceeds to the processing of step ST8 without passing through the correction processing of step ST7. Then, at step ST8, it is judged whether or not the coordinates are for the drawn screen. When not for the drawn screen, the text is discarded (ST9), then the routine proceeds to the processing of step ST10, while when for the drawn screen, the routine proceeds to the processing of step ST10 without passing through the processing of step ST9. At step ST10, it is judged whether or not the drawing processing ends. When it does not end, the routine proceeds to the processing from step ST2. When is judged at step ST10 that the drawing processing ends, the text is sorted (ST11) and the text with the same style is transferred (ST12). When it is judged at step ST4 that the style is selected, the corresponding object is converted to speech (ST15) and the buffer of the text is cleared (ST14).

Note that, in the present embodiment, the text notified as the display request from the browser is treated as text information for the text-to-speech operation. Then, in each principal step, specifically the following processing is carried out.

The coordinate correction of step ST7 becomes the following processing. For example, as shown in FIG. 4, the coordinate position would be deviated in the drawing by the specific style, so the coordinate position is corrected in accordance with the display format (style) and the font size. The coordinate position of a special display object (link) such as "APPLES" is corrected. When the style of the link is notified by the drawing request, the correction value in accordance with the current font size is determined from the database for correcting the coordinates and corrected. For example, as shown in FIG. 5, when taking as an example a case where the notified information of "APPLES" is that the coordinate value X is 0 and Y is 5, the style is "LINK", the number of letters is "6", the current font size setting is "FONT SIZE STANDARD", and the correction values of the style (LINK) are "Y-3" for the small font size, "Y-5" for the standard font size, and "Y-8" for the large font size, the coordinate position is corrected as follows.

The coordinate values are corrected based on the above information. The font size is standard at the style (LINK), so −5 is added to the Y-coordinates of the six letters "APPLES", and the coordinate values are made (X:0, Y:0).

Further, at step ST11, if the text-to-speech operation is carried out in the sequence of notification of the drawing requests, sometimes the result will not become a sentence, therefore sorting is carried out by using the coordinate values accompanying the text. Note that, as the coordinate values, the values after the correction processing are used.

FIG. 6 shows an example of the storage of storage management information and the storage regions of text before sorting the text, and FIG. 7 shows an example of the storage after sorting the text. In this example, as shown in FIG. 6, the text before the text sorting is "FRUIT:", "100 YEN", "TWO", "ORANGES", "200 YEN", "MELONS", "300 YEN", "STRAWBERRIES", "400 YEN", and "APPLES", but after the text sorting, as shown in FIG. 7, it becomes "FRUIT:", "APPLES", "100 YEN", "TWO", "ORANGES", "200 YEN", "MELONS", "300 YEN", "STRAWBERRIES", and "400 YEN"

Further, a different drawing style is notified for each display object, therefore a text-to-speech operation in accordance with the display object is carried out. When taking as an example the screen image of FIG. 4, the text of the link is converted to speech by speech different from the standard (set speech).

Further, the object to which the cursor moves is specified by the drawing style, and the corresponding text is converted to speech by changing the type of the speech. When taking as an example the screen image of FIG. 4, the text of "APPLES" is converted to speech by speech different from the standard.

Further, a drawing request is transferred for each line or object, therefore a smooth text-to-speech operation is carried out by buffering and notifying a plurality of drawing requests all together to the text-to-speech engine (controller and speech synthesizing processing unit). For example, as shown in FIG. 8, even when text is notified for each line, it is possible to convert the same to speech by the same text-to-speech method by ignoring the change of lines.

Further, a line scrolling operation during text-to-speech conversion buffers the newly displayed line and transfers it to the text-to-speech engine at the point of time when the text-to-speech conversion ends.

Further, at the time of page scrolling or jumping to another screen, the text being converted to speech is discarded, and the text-to-speech operation is carried out from the header of the page.

Further, the text notified during the interval from the drawing start request to the drawing end request is set as covered by the text-to-speech conversion. Further, when text is notified at the same coordinates, the first notified text is made valid.

When moving the cursor to a selectable object, the text being converted to speech is interrupted, and the corresponding object is converted to speech.

On a screen display, text is sometimes displayed cut off at its top and bottom. In this case, the coverage of the text-to-speech operation is determined by the coordinate values.

When displaying a screen etc. stored in the cache, the drawing request was not notified, therefore the text is acquired by requesting re-drawing.

An object not having any text is judged by the style and is converted to speech by specific text. For example, for a radio button or other object not having any text, the text-to-speech operation is accomplished by transferring text inside the processing unit to the engine constituted by the controller at the point of time of the move and determination.

As explained above, according to the present embodiment, provision is made of the memory 12, the speech synthesizing processing unit 17 for converting text to speech, and the controller 19 for extracting from web information acquired from the server 30 connected to the network 20 by the communication unit 11 a display object and display rules defined by the server 30 providing the display object, storing the display object and the display rules in the memory 12 linked with each other, and making the display units 16 and 15 display the same according to the display rules. The controller 19 makes the speech synthesizing processing unit 17 convert text extracted from the display object to speech with reference to the display rules stored in the memory 12 when start-up of the speech synthesizing processing unit 17 is requested in the state displaying the acquired web information. Further, the controller 19 is configured so as to correct coordinate values in accordance with the style of the notified text, perform the text-to-speech operation after sorting not in the sequence of notification, but by the coordinates, change the speech quality, speed, intonation, etc. of the text-to-speech operation in accordance with the display style, change the speech quality, speed, and intonation of the text-to-speech operation at the time of change of the selectable object, and convert text to speech only once even when the same text is notified by for example blinking. Therefore, the following effects can be obtained.

Smooth text-to-speech conversion can be realized. Because drawing requests are used for the text-to-speech operation, the operation can be realized without modifying the browser. As a result, display equivalent to that by an ordinary browser becomes possible. When converting text to speech by the same speech quality, by converting text notified divided into several sections all together, interruption of the text-to-speech operation can be prevented, and the probability of correctly reading phrase rises. Further, during the text-to-speech conversion, the newly displayed text is buffered, therefore the buffered text can be converted to text after the end of a text-to-speech operation. This enables interruption of the text-to-speech operation to be prevented.

Further, the text-to-speech operation can be interrupted when another screen is displayed and therefore the screen and the text-to-speech conversion can be matched. Further, when the cursor moves to another selectable object, the text-to-speech operation can be interrupted and the corresponding object converted from text to speech, so text-to-speech operation is possible without offset in the selected timing.

Further, for text partially sticking out from the display area, the text-to-speech target range can be determined by the coordinate values, so double conversion to speech can be prevented. At the time of cache display or otherwise when the text is not notified, the text can be notified again by requesting re-drawing. Since the same screen is displayed even if acquiring the text and drawing it again, flickering does not occur. Further, by judging an object not having any text by the style, it is possible to give it specific text and convert that text to speech.

Note that the text-to-speech conversion processing explained above is stored in a storage medium which can be read by a terminal (computer), a semiconductor storage device (memory), an optical disk, a hard disk, etc. as a text-to-speech program and is read out and executed by the terminal.

While the invention has been described with reference to specific embodiments chosen for purpose of illustration, it should be apparent that numerous modifications could be made thereto by those skilled in the art without departing from the basic concept and scope of the invention.

What I claim is:

1. A mobile terminal, comprising:
   a communication unit for communicating with a server connected to a network for acquiring information including display objects and display rules;
   a display unit for displaying the display objects acquired from the server;
   a storage unit;
   a speech synthesizer for converting text to speech; and
   a controller for extracting display objects and display rules which include at least display coordinates of the display objects and are defined by the server, from the acquired information,
   storing the extracted display objects and the display rules in the storage unit linked with each other, and storing correction values for the display coordinates,
   displaying the extracted display objects on the display unit according to the display coordinates in the extracted display rules,
   extracting text from each of the display objects including at least a first word and a second word in that order to form a first word sequence,
   sorting the first word sequence of the text extracted from the each of the display objects in the storage unit based on each of the display coordinates applied with the stored correction values in a case where the display unit displays two or more display objects to form a second word sequence including at least the second word and the first word in that order, and
   controlling the speech synthesizer for converting to speech the second word sequence of the text including at least the second word and the first word in that order in response to a request of a start-up of the speech synthesizer to convert the display objects having the first word sequence to speech.

2. A mobile terminal as set forth in claim 1, wherein:
the display rules further include display formats of the display objects,
the storage unit stores correction values for the display coordinates for the plurality of display formats, and
the controller sorts the order after correcting them by correction values in accordance with each of the display formats of the individual display objects.

3. A mobile terminal as set forth in claim 1, wherein:
the display rules further includes display sizes of the display objects,
the storage unit stores correction values for the display coordinates for the plurality of display sizes, and
the controller sorts the order after correcting them by correction values in accordance with each of the display sizes of the individual display objects.

4. A mobile terminal as set forth in claim 1, wherein:
the display rules further include display formats of the display objects, and
the controller searches for a display object linked with the display format for displaying the display object where a cursor on the display unit is located from among the plurality of display objects stored in the storage unit and controls the speech synthesizer so as to convert the text of the retrieved display object to speech in response to a request of a start-up of the speech synthesizer.

5. A mobile terminal as set forth in claim 4, wherein the controller controls so that the speech synthesizer converts the text of the cursor located display object to speech by speech different than the speech in response to a request of a start-up of the speech synthesizer is requested.

6. A mobile terminal as set forth in claim 4, wherein the controller controls so that the speech synthesizer converts the text to speech for a linked display object by speech different from a standard when there are a plurality of linked display objects.

7. A text-to-speech method of a mobile terminal having a speech synthesizing function for converting a text to speech and a displaying function for displaying display objects extracted from information acquired from a server connected to a network on a display unit,
said method including:
extracting the display objects and display rules which include at least display coordinates of the display objects and are defined by the server, from the acquired information;
storing the extracted display objects and the display rules in a storage unit linked with each other and storing correction values for the display coordinates;
displaying the extracted display objects on the display unit according to the display coordinates in the extracted display rules;
extracting text from each of the display objects including at least a first word and a second word in that order to form a first word sequence,
sorting the first word sequence of the text extracted from the each of the display objects in the storage unit based on each of the display coordinates applied with the stored correction values in a case where the display unit displays two or more display objects to form a second word sequence including at least the second word and the first word in that order, and
converting to speech by the speech synthesizer the second word sequence of the text including at least the second word and the first word in that order in response to a request of a start-up of the speech synthesizer to convert the display objects having the first word sequence to speech.

8. A text-to-speech method of a mobile terminal as set forth in claim 7, wherein
the display rules further include display formats of the display objects, and
when sorting an order of the texts extracted from the each of the display objects in the storage unit based on each of the display coordinates, the method further includes:
storing correction values for the display coordinates for the plurality of display formats, and
sorting the display objects after correcting them by correction values in accordance with each of the display formats of the individual display objects.

9. A text-to-speech method of a mobile terminal as set forth in claim 7, wherein
the display rules further include display sizes of the display objects, and
when sorting an order of the texts extracted from the each of the display objects in the storage unit based on each of the display coordinates, the method further includes:
storing correction values for the display coordinates for the plurality of display sizes, and
sorting the display objects after correcting them by correction values in accordance with each of the display sizes of the individual display objects.

10. A text-to-speech method of a mobile terminal as set forth in claim 7, wherein
the display rules further include display formats of the display objects, and
when sorting an order of the texts extracted from the each of the display objects in the storage unit based on each of the display coordinates, the method further includes:
searching for a display object linked with the display format for display where a cursor on the display unit is located from among the plurality of display objects stored in the storage unit, and
converting the text of the retrieved display object to speech in response to a request of a start-up of the speech synthesizing function.

11. A text-to-speech method of a mobile terminal as set forth in claim 10, wherein
when sorting an order of the texts extracted from the each of the display objects in the storage unit based on each of the display coordinates, the method further includes:
converting the text of the cursor located display object to speech by speech different than the speech in response to a request of a start-up of the speech synthesizing function.

12. A text-to-speech method of a mobile terminal as set forth in claim 10, wherein
when sorting an order of the texts extracted from the each of the display objects in the storage unit based on each of the display coordinates, the method further includes:
converting text to speech for a linked display object by speech different from a standard when there are a plurality of linked display objects.

13. A mobile terminal as set forth in claim 1, wherein a display object not having text is converted to speech.

14. A text-to-speech method of a mobile terminal as set forth in claim 7, wherein a display object not having text is converted to speech.

15. A mobile terminal as set forth in claim 1, wherein text being output as speech by the speech synthesizer is discarded at the time of page scrolling on the display unit.

16. A text-to-speech method of a mobile terminal as set forth in claim 7, wherein text being output as speech by the speech synthesizer is discarded at the time of page scrolling on the display unit.

\* \* \* \* \*